US010024705B2

(12) United States Patent
Kech

(10) Patent No.: US 10,024,705 B2
(45) Date of Patent: Jul. 17, 2018

(54) WEATHER DATA-DEPENDENT LEVEL SENSOR RETRIEVAL

(71) Applicant: VEGA Grieshaber KG, Wolfach (DE)

(72) Inventor: Guenter Kech, Wolfach (DE)

(73) Assignee: VEGA GRIESHABER KG, Wolfach (DE)

( * ) Notice: Subject to any disclaimer, the term of this patent is extended or adjusted under 35 U.S.C. 154(b) by 110 days.

(21) Appl. No.: 14/937,275

(22) Filed: Nov. 10, 2015

(65) Prior Publication Data
US 2016/0169729 A1 Jun. 16, 2016

(30) Foreign Application Priority Data
Dec. 16, 2014 (EP) .................. 14198153

(51) Int. Cl.
*G01F 23/00* (2006.01)
*G01W 1/10* (2006.01)

(52) U.S. Cl.
CPC ...... *G01F 23/0076* (2013.01); *G01F 23/0069* (2013.01); *G01W 1/10* (2013.01); *G01W 2203/00* (2013.01); *Y04S 20/40* (2013.01)

(58) Field of Classification Search
CPC . G01F 23/0076; G01W 1/10; G01W 2203/00; Y04S 20/40
USPC ....... 73/1.79, 1.81, 170.16, 198, 861; 702/1, 702/2, 3
See application file for complete search history.

(56) References Cited

U.S. PATENT DOCUMENTS

| 2,906,026 | A | 9/1959 | Hanes |
| 5,239,203 | A | 8/1993 | Thorngren et al. |
| 2011/0120561 | A1* | 5/2011 | Quigley .................. E03F 1/00 137/1 |
| 2011/0307106 | A1* | 12/2011 | Dutt ........................ E03F 7/00 700/282 |

FOREIGN PATENT DOCUMENTS

| DE | 32 39 920 | 5/1984 |
| DE | 195 37 850 | 4/1997 |
| DE | 10 2005 032 621 | 2/2006 |
| WO | 2009/082473 | 7/2009 |

OTHER PUBLICATIONS

Li et al., "Design and Implementation of a Wireless Sensor Network-Based Remote Water-Level Monitoring System", Sensors, vol. 11, No. 12, Dec. 2011, pp. 1706-1720.
Kim et al., "Case study for determination of a water level monitoring frequency for nationwide groundwater monitoring networks in Korea", Journal of Hydrology, vol. 342, No. 3-4, Jul. 28, 2007, pp. 223-237.
"IDS Smart Tide Gauge", Broschüre, Apr. 16, 2013, 2 sheets.

* cited by examiner

*Primary Examiner* — Benjamin Schmitt
(74) *Attorney, Agent, or Firm* — Fay Kaplun & Marcin, LLP

(57) ABSTRACT

A measurement device arrangement includes a measurement device measuring a distance to an object, for example in the form of a depth measurement. A control unit is provided, which calculates the point in time for the next distance measurement, taking account of current or predicted weather conditions at the location of the measurement device. The frequency of the measurement can thus be adjusted to the weather conditions in order to reduce the power consumption of the measurement device without having to go without punctual reports of depth changes in the process.

8 Claims, 2 Drawing Sheets

WEATHER DATA-DEPENDENT LEVEL SENSOR RETRIEVAL

REFERENCE TO RELATED APPLICATIONS

This application claims the benefit of the filing date of European Patent Application Serial No. 14 198 153.0 filed on 16 Dec. 2014, the disclosure of which is hereby incorporated herein by reference.

FIELD OF THE INVENTION

The invention relates to distance and level measurement. In particular, the invention relates to a measurement device arrangement comprising a measurement device for measuring a distance to an object, to a method for measuring a distance from a measurement device to an object, to a program element and to a computer-readable medium.

TECHNICAL BACKGROUND

When measuring the depth of a body of running or standing water, or when making other level or distance measurements such as measuring snow depth in the mountains, measurement devices (sensors) which are powered by means of a battery or rechargeable battery are often used, since supplying power via a cable is usually not possible or at least not provided.

In order to be able to use the limited energy available over as long a time period as possible, the times between two successive measurements can be increased. It is thus usually sufficient to measure the depth of a river once a day. However, in this case, rapid depth changes are, in some circumstances, only measured and reported to the control station after a delay of several hours.

SUMMARY OF THE INVENTION

A first aspect of the invention relates to a measurement device arrangement comprising a measurement device for measuring a distance to an object, for measuring a flow rate or a pressure. The measurement device arrangement may, for example, be a complete measuring system which also comprises, as well as the actual measurement device, further apparatuses such as a control station or control centre and a weather service.

The measurement device is, for example, a level measurement device, a flow measurement device, a pressure measurement device or a depth measurement device for determining the level or the depth of a medium, i.e. in particular a body of standing water, a body of running water, or snow. The measurement device may be a non-contact measurement device, for example a radar level indicator, or it may be a measurement device which does not measure in a non-contact manner but uses a waveguide or resonator for example which protrudes into the medium.

The measurement device arrangement comprises one or more control units. At least one of these control units is designed for calculating a point in time for a next measurement of the distance, the calculation of the point in time being made taking account of current and/or predicted weather information relating to the weather at the location of the measurement device.

This may help to keep the power consumption of level or depth measurement devices low, and at the same time measure the current level or depth in such a way as to have as small a time delay as possible.

When calculating the point in time for the next measurement/when calculating the points in time for the next measurements, further information may also be taken into account, such as the point in time at which a barrage is opened (i.e. water is let out) or avalanche blasting is to be carried out.

The control unit which calculates the point in time for the next measurement of the distance may, for example, be integrated in the measurement device itself. However, it may also be provided for said control unit to be integrated in another instrument, for example a control station remote from the measurement device, which can be communicatively connected to the measurement device (for example via an air interface).

The control unit may also be integrated in a weather station or in a system of weather stations, the weather station or the system of weather stations being designed in this case for communicating with the measurement device and/or the control station in order to provide the current and/or predicted weather information to the measurement device or the control station.

It is thus possible, for example, for the weather station to transmit the weather forecast to the control station and for said control station to then calculate and transmit to the measurement device the appropriate point in time for a future distance measurement, or even several appropriate points in time for future distance measurements. The required processing capacity in the measurement device can thus be reduced, and at the same time the data transfer between the measuring device and the control station can be reduced. In particular, it is possible in this manner for the control station to specify a complete measuring cycle to the measurement device, which cycle is to be followed over the following days. It may also be provided for the measurement device to modify this measuring cycle, for example if the external circumstances change or do not occur in the manner predicted by the weather forecast.

According to a further embodiment of the invention, when calculating the point in time for the next measurement of the distance, the control unit also takes into account an archive of past distance measurements carried out by the measurement device, in addition to the current and/or predicted weather information.

Thus, the archive of past distance measurements alone may result in the need to increase or reduce the measuring frequency, i.e. to reduce or increase the interval between future measurements so as to be able to detect distance changes (such as depth changes, etc.) sufficiently early.

According to a further embodiment of the invention, the control unit of the measurement device is designed for determining a point in time for transmitting measured data to the control station, taking account of the current or predicted weather information. In this case, the change over time in the distance of the object from the measurement device can also be taken into account. In this case, the point in time for transmitting the measured data does not necessarily correlate with the point in time of the last measurement. Rather, taking account of the weather information and, optionally, the archive of past distance measurements carried out by the measurement device, as well as the rate of change of the distance, may result in there being no need to transmit measured values to the control station at the current point in time, since the depth has not changed or has changed only slightly. The data transfer between the measurement device and the control station can be further reduced in this manner.

A further aspect of the invention relates to a method for measuring a distance from a measurement device to an object, in which a point in time for the next measurement of the distance is taken into account, on the basis of current or predicted weather information relating to the weather at the location of the measurement device.

A further aspect of the invention relates to a program element which, when run on a control unit of a measurement device arrangement as described above, instructs the control unit to carry out the method described above and in the following.

A further aspect of the invention relates to a computer-readable medium, on which the above-described program element is stored.

It should be noted at this point, that the features described above and in the following with reference to the measurement device arrangement can also be implemented as method steps, and that the measurement device arrangement can be designed to carry out all the method steps described above and in the following.

In the following, embodiments of the invention, given by way of example, will be described with reference to the figures.

DETAILED DESCRIPTION

Figure 1:
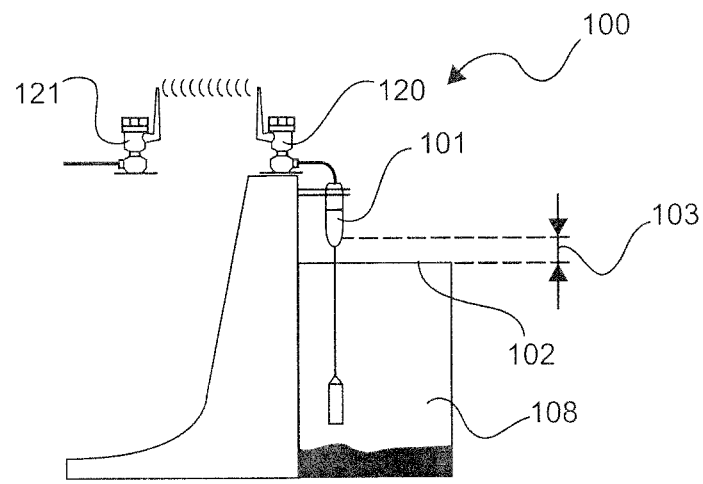
FIG. 1 shows a portion of a measurement device arrangement according to an embodiment of the invention given by way of example.

The drawings are schematic and not to scale.

When, in the following description of the figures, the same reference numerals are used in different figures, they identify the same or similar elements. However, like or similar elements may also be denoted by different reference numerals.

FIG. 1 shows a measurement device arrangement 100 according to an embodiment of the invention given by way of example. The measurement device arrangement 100 comprises a TDR measurement device 101 for measuring a distance 103 to the surface 102 of a body of standing or flowing water 108. The measurement device 101 is connected to a communication unit 120 which can communicate wirelessly (or in a wired manner) with a corresponding communication unit 121 in order to exchange data between the measurement device 101 and a control station 109 (see FIG. 2).

Alternatively, the measurement device 101 may also be configured as a pressure measurement device or as a flow measurement device for measuring the flow rate through a pipeline.

The measurement device 101 comprises a control unit 105 (see also FIG. 2), which for calculating a point in time for the next measurement, which is a distance measurement to an object, a flow rate measurement or a pressure measurement. The distance measurement may be a depth measurement for example, as is the case in FIG. 1. Said point in time is calculated taking account of weather information at the location of the measurement device.

In addition or alternatively to weather information relating to the location at which the measurement device is installed, weather information relating to the weather at a remote location, for example upstream of the measurement device or on a mountain which supplies water to the body of standing or running water, may also be taken into account.

If the depth increases rapidly as a result of a sudden change in the weather, measurements at very short time intervals are desirable, and should also be reported to the control station if the rate of change in the depth makes this necessary.

This depth change can be predicted by taking account of the weather information, meaning that the measurement time points can be appropriately calculated.

In other words, the measurement intervals are adjusted to the current or likely future weather.

The frequency of the distance measurements can thus be influenced by the weather predictions, in order to save power and at the same time ensure that depth changes are identified in good time.

The measured data are sent to the control station at the necessary points in time. If the connection to the control station has been successfully established, once the measured data have been transmitted, the weather data or the points in time for future measurements can be transmitted to the measurement device. Thus, power can again be saved.

Accordingly, in the event of a weather report of "heavy rain", the measurement rate can be increased at the expected onset of the heavy rain (or optionally also slightly later, specifically if a corresponding depth change is to be expected). The same is the case when a hailstorm or heavy snowfall is to be expected. It is also possible to increase the measurement rate if a significant temperature increase is to be expected, which will lead to snowmelt, or if an avalanche is expected to occur.

If the predicted event (heavy rain, hailstorm, heavy snowfall, avalanche, snowmelt) does not occur or has already happened, the measurement rate can be reduced again, optionally following a predefined delay time or after falling below a specific level. The same also applies to the reporting to the control station.

The power thus saved in the measurement device can be used for additional measurements.

Since the depth of a body of water, for example a river or a sewer, can change depending on the weather, it is advantageous to include the weather information at the location of the measurement device and/or upstream/uphill thereof in order to be able to set the measurement rate as optimally as possible. Measurement devices adjusted to the usage conditions and/or environmental conditions can be used for depth or distance measurements of this kind, which devices carry out different measurement methods. Examples of these are TDR devices, radar devices, ultrasound devices, hydrostatic devices and radiometry devices.

These measurement devices can be used at locations where there is no supply of power available in the immediate vicinity. Therefore, battery or rechargeable battery systems or solar-powered supply systems are used as power sources in these remote measurement devices. In order to prevent a complete loss of power in the battery or rechargeable battery system, said systems should be replaced or recharged in good time. Since replacement is often complex, and the rechargeable battery cannot always be automatically recharged, the power consumption of the sensors should be kept as low as possible. The power consumption can be lowered by reducing the measurement rate and the amount of data exchanged between the sensor and the control station.

Due to the large distance between the measurement device and the control station, measurement devices comprising a radio module 120 are also used, which devices are coupled to the control station via a radio network such as GSM. Internet-based transmission protocols can also be used. Said radio modules also require power. The power requirement of the radio modules 120 may be significantly greater than the power requirement for the actual measurement by the measurement device. It is therefore provided, if possible, for transmitting and receiving to occur less frequently than measuring.

For example, the depth of the body of water 108 is measured four times a day (or once a day), but the measured values are transmitted to the control station only once a day (or every other day). When transmitting the measured values to the control station, current weather data and the corresponding weather predictions are retrieved by the sensor. Alternatively, the sensor may retrieve future measurement time points (in this case, the weather data are therefore not analysed in the sensor but in the control station for example). It is also possible to obtain this data directly from an external service which provides the weather data and optionally also undertakes the analysis thereof. These data are provided to the control station or the sensor by the external service, for example as an XML file.

The control station adjusts the points in time for the sensor measurements (i.e. the measurement intervals) and the transmission intervals for the data transfer from the sensor to the control station on the basis of these weather predictions or weather reports. Thus, for example, in the event of a weather warning for "heavy rain", the depth is measured every 30 minutes and the measured data are transmitted to the control station every 80 minutes, at least if the depth has changed sufficiently.

For some uses, it is provided for the weather warning or weather prediction to trigger an increased measurement rate in the run-up to said weather event, and for the sensor itself to take account of the relative depth change in a specified time range in order to temporally control the reports to the control station. This method makes it possible to ensure that the sensor still begins the measurement punctually, but does not consume an unnecessarily large amount of power, since it automatically adjusts the points in time for future measurements and for the transmission of the measured values in accordance with the rate of depth change.

Figure 2:
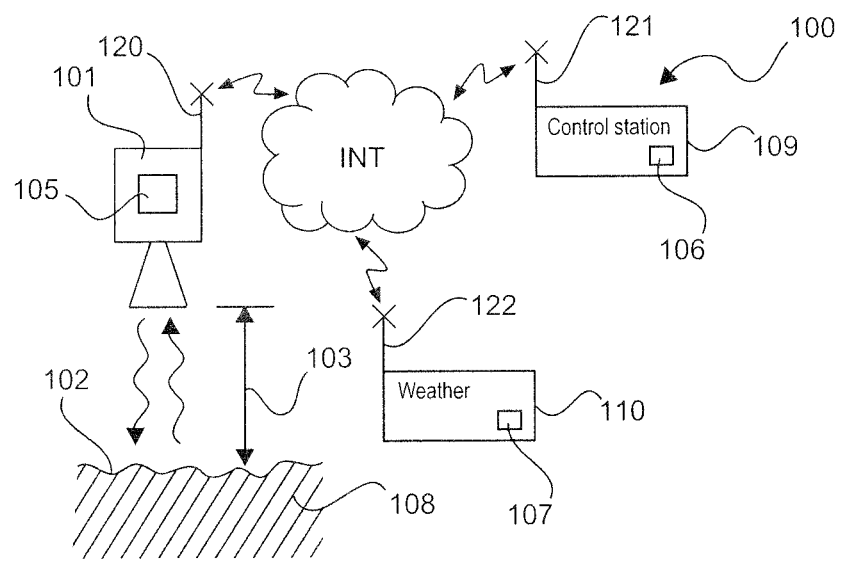
FIG. 2 shows a measurement device arrangement according to a further embodiment of the invention given by way of example.

FIG. 2 shows a measurement device arrangement 100 according to a further embodiment of the invention given by way of example. The measurement device 101 comprises a control unit 105 and an air interface 120. The control station 109, which is arranged so as to be remote from the measurement device, likewise comprises a control unit 106 and an air interface 121. In addition, a weather station 110 or an external weather service is provided, which likewise comprises a control unit 107 and an air interface 122.

The communication between the measurement device 101, the control unit 109 and the weather service or the weather station 110 can take place via a cellular radio network or the internet for example.

The measurement device of FIG. 2 is, for example, a radar level indicator which operates in a non-contact manner.

Figure 3:
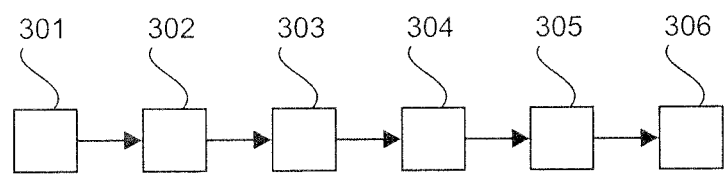
FIG. 3 is a flow diagram of a method according to an embodiment of the invention given by way of example.

FIG. 3 is a flow diagram of a method according to an embodiment of the invention given by way of example. In step 301, weather data at the location and in the environment of the measurement device are detected. Weather information relating to the current weather or the weather to be expected in the future at the location of the measurement device can be calculated from this weather data (step 302). In step 303, the point in time for a future measurement is then calculated from this weather information, optionally taking account of further information (point in time for opening a barrage, current rate of change of the depth).

This point in time is then transmitted to the measurement device in step 304, and in step 305 the measurement device determines the actual point in time for the next measurement, taking account of the archive of previous measurements/depths. In step 306, the detected measured data are transmitted to the control station, since the field device has determined that the depth has indeed changed significantly compared with the previous measurement.

Figure 4:
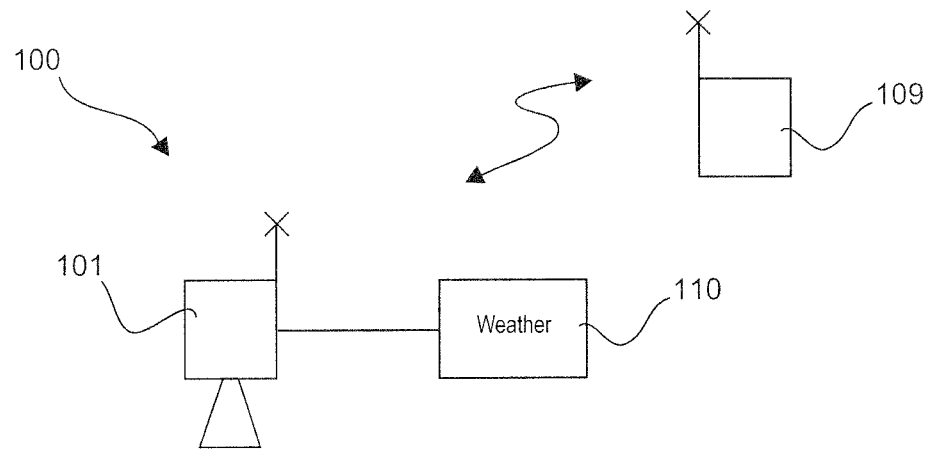
FIG. 4 shows a measurement device arrangement according to a further embodiment of the invention given by way of example.

FIG. 4 shows a measurement device arrangement 100 according to a further embodiment of the invention given by way of example. The measurement device 101 is directly connected to a weather station 110 so as to thus directly obtain the weather information from the weather station 110 and analyse said information itself.

Figure 5:
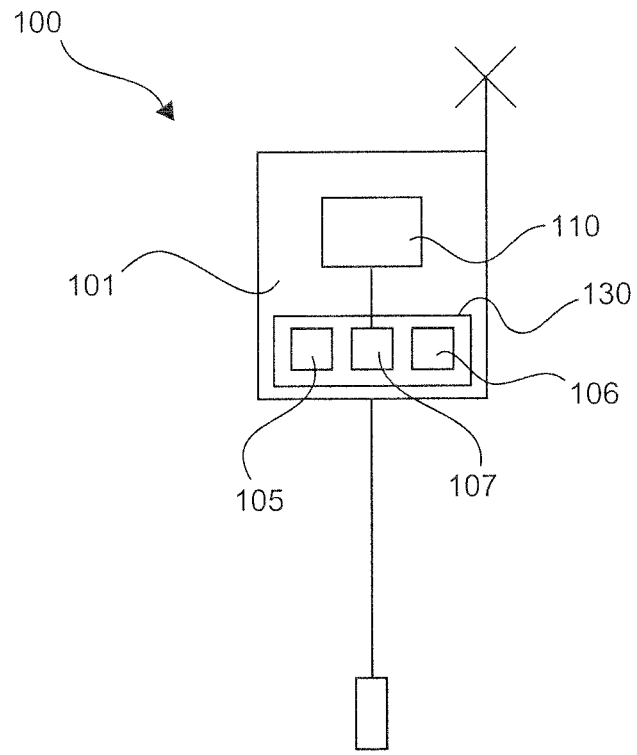
FIG. 5 shows a measurement device arrangement according to a further embodiment of the invention given by way of example.

FIG. 5 shows a further embodiment, given by way of example, of the measurement device arrangement 100, which in this case consists merely of the measurement device 101. A central control unit 130 is provided, which contains the control units 105, 106, 107, with the result that the measurement device 101 can automatically gather all the data and carry out all calculations. In particular, the field device 101 comprises a weather station 110 integrated therein. This may be a barometer for example.

For the sake of completeness, it should be noted that "comprising" and "having" do not exclude the possibility of other elements or steps, and "an" or "a" does not exclude the possibility of a plurality. It should further be noted that features or steps which have been described with reference to one of the above embodiments may also be used in combination with other features or steps of other above-described embodiments. Reference numerals in the claims should not be treated as limiting.

The invention claimed is:

1. A measurement device arrangement, comprising:
    a measurement device configured to measure data, the data including a distance to an object, a pressure or a flow rate, the measurement device including a control unit, wherein the control unit is integrated in the measurement device;
    wherein the control unit is configured to calculate a first time for a next measurement of the data based on weather data, the weather data including a current or predicted weather information at a location of the measurement device;
    wherein the control unit is configured to determine a rate of change of the measured data; and
    wherein the control unit is configured to determine a second time for transmitting the measured data to a control station based on the weather data and based on the determined rate of change of the measured data.

2. The measurement device arrangement according to claim 1, wherein the measurement device is configured to measure a level or a depth of a medium, the data further including the level or the depth of the medium.

3. The measurement device arrangement according to claim 1, wherein the control station is arranged so as to be remote from the measurement device, the control station communicating with the measurement device.

4. The measurement device arrangement according to claim 1, further comprising:
   a weather station communicating with the measurement device or the control station to provide the weather data the measurement device or the control station.

5. The measurement device arrangement according to claim 1, wherein the control unit is further configured to calculate the first time based on an archive of past measured data carried out by the measurement device.

6. The measurement device arrangement according to claim 1,
   wherein the second time is uncorrelated with the first time.

7. A method for measuring data, the data including (a) a distance from a measurement device to an object, (b) a pressure or (c) a flow rate, comprising the step of:
   calculating a first time for a next measurement of the data based on weather data, the weather data including a current or predicted weather information at a location of the measurement device;
   determining a rate of change of the measured data; and
   determining a second time for transmitting the measured data to a control station based on the weather data and based on the determined rate of change of the measured data.

8. A non-transitory machine-readable medium on which a program element is stored which, when executed on a processor, instructs the processor to:
   calculate a first time for a next measurement of the data based on weather data, the weather data including a current or predicted weather information at a location of the measurement device;
   determine a rate of change of the measured data; and
   determine a second time for transmitting the measured data to the control station based on the weather data and based on the determined rate of change of the measured data.

* * * * *